United States Patent Office 3,481,750
Patented Dec. 2, 1969

3,481,750
AMBER GLASSES AND PROCESS
Arthur B. Swain, Toledo, Ohio, assignor to Owens-Illinois, Inc., a corporation of Ohio
No Drawing. Filed July 28, 1965, Ser. No. 475,559
Int. Cl. C03c 3/04
U.S. Cl. 106—52                    6 Claims

ABSTRACT OF THE DISCLOSURE

An amber colored frit glass of relatively concentrated color intensity and having $Fe_2O_3$ and MnO in relatively proportioned amounts of $Fe_2O_3$ to MnO, on a theoretical oxide basis, ranging from 17.60–19.24 parts by weight of $Fe_2O_3$ to 26.89–28.07 parts by weight of MnO as the predominant color producing constituents is produced under oxidizing conditions and may be dissolved in a substantially greater proportionate amount of essentially colorless molten soda-lime glass while the latter is in an oxidized condition and while flowing through the forehearth of a glass melting furnace to thereby impart closely controllable amber color and ultra violet light absorption characteristics to the resultant composite glass.

---

This invention relates to oxidized amber glasses and to the production thereof.

Still further, this invention relates to oxidized, colorant-enriched frit glasses which can be added to colorless flint base glasses to produce oxidized amber glasses.

Further this invention relates to high color frit glass batch compositions for producing oxidized amber frit glasses.

BACKGROUND FOR THE INVENTION

Conventional reduced ambers

In the prior art, so far as known, all amber glasses have been of the reduced type. These depend for their color qualities on a chromophore of iron in the reduced, ferrous state and sulfur in the reduced, sulfide state. This means that some agent must be used to convert the iron and sulfur from their normal oxidized states into the reduced states. In order to accomplish the reduction, the prior art has utilized two media:

(1) Reducing conditions in the atmosphere above the molten glass which contains iron and sulfur in appropriate amounts; or
(2) Addition to the batch, of a reducing agent such as powdered carbon in the form of sea coal.

During the melting and fining operations the reducing atmosphere removes oxygen from the melt. In the case of a reducing agent it burns off as carbon monoxide and carbon dioxide. Both of these systems are effective to reduce ferric iron oxide, $Fe_2O_3$, to ferrous iron oxide, FeO; and to reduce sulphate sulfur into sulfide sulfur. These two substances combine into a color complex or chromophore in the molten glass. This color complex absorbs rays in the ultraviolet region and also gives the glass its distinctly amber color in the visible region. The amber color is characteristic of amber container glasses.

It will be apparent that both the reducing atmosphere and the use of a consumable additive reductant are expensive in high volume commercial operations. One method of maintaining the reducing atmosphere in a glass melting furnace is to keep the amount of oxygen in the combustion gases to less than that required to effect complete combustion of the fuel. This is inefficient of course and causes unduly large amounts of fuel to be used relative to the amount of heat actually extracted therefrom. Also, it has been one practice to implement a reducing atmosphere by the introduction of a reducing gas such as hydrogen, carbon monoxide, methane or other. These are also expensive as will be evident to the skilled artisan, when consideration is given to the fact that huge amounts of such gases are required in commercial operations where 200 tons or more of glass are being melted on a continuous, 24 hour a day basis.

Further, amber colored glass, as is well known, has a very low transmissivity for infrared rays, which are commonly used to heat the batch materials and produce molten glass in the melter. Thus infrared rays are produced by the intense heat of combustion of a fuel whose flames are directed across the melting chamber. Since amber does not readily transmit infrared, the heat of combustion is prevented from penetrating deeply into the body of the melt. Therefore, the melting of deeply colored ambers is very uneconomical and in many cases substantially impossible because of the resulting inhomogeniety of the melt.

Therefore, a substantial advance to the art would be provided by a more efficient and economical process for producing amber glass.

By the present invention, both the disadvantage of a reducing agent and the disadvantage of low heat transfer have been overcome by using a colorless, oxidized flint glass as a base glass.

FOREHEARTH PROCESS

The manufacture of colored glass by the addition of an enriched colorant frit glass to the forehearth is a well recognized and commercially successful practice. For example, an earlier Patent 2,115,408 is called to the reader's attention as one example of operation of the forehearth colorant process. A more recent patent on the subject of forehearth coloration is the Hagedorn Patent No. 3,024,121. Both of these patents relate to the addition of a frit glass to the molten base glass during the latter's passage through the forehearth of a glass melting furnace. Suitable stirring devices are utilized to render the composite glass of homogeneous color before it is issued out of the delivery spout of the forehearth. There are certain disadvantages, but the advantages outweight the disadvantages so that this process has received enthusiastic reception over the past few years. The advantages are quickly apparent. By this process, as many colors can be produced simultaneously from a single melting furnace as there are forehearths associated with the furnace. Thus, short runs of a specific or unique color can be made economically as distinguished from the prior full melter operation.

However, forehearth temperatures are lower than those in the melter and this has produced problems when colorants are added to the forehearth. Generally the melting and fining zones of a glass melting furnace are maintained at substantially higher temperatures than the forehearth. Thus melting and fining temperatures in the range of 2500–2950° F. are common. These temperatures cause bubbles of occluded and chemically produced gases to be driven out of the melt and thus fine the glass. This prevents seeds and blisters from being formed in the final ware. The higher temperatures reduce the viscosity so that the gases are ejected. But temperatures in the forehearth must be reduced substantially to the forming temperature of the glass so that the glass will have sufficient viscosity to form properly. If the glass is too hot, the viscosity will be too low to form properly. Therefore forming temperatures are generally in the range of 2350–2950° F. These temperatures are too low to refine the glass and remove the seeds. Thus any gases developed in the forehearth remain as tiny bubbles.

By some prior known process for producing ambers by forehearth addition, a reducing agent was added to the base glass. This was particularly troublesome as regards the production of off-gas and seeding. The reducing agents caused the oxides and oxide complexes in the molten glass to break down and release oxygen, carbon dioxide, etc. These became trapped because of the higher viscosity of the glass and formed seeds and blisters. The ware produced was unsatisfactory.

A further advance to the art would therefore be provided by a novel forehearth colorant process for producing amber glasses wherein off-gas formation is eliminated. This has been provided by the present invention because oxidizing conditions are used in the melter and in the forehearth, and there are no reducing agents in the oxidized frit glass.

Further, in the past, forehearth colorant processes have encountered problems because of the incompatability of the decolorizers in the base glass with the added frit glass. By the present invention this problem of incompatability is overcome by the use of an oxidized base glass and the addition thereto of an oxidized frit glass, both being unique for the production of amber glasses.

Also the prior art has encountered difficulties in the fact that frit glasses were difficult to melt. Frit glasses heretofore used have often had such high softening and liquidus temperatures as compared to the base glass that they do not melt readily and do not mix thoroughly into the base glass at forehearth temperatures. In fact, in some chromium-colored green glasses, actual crystals of chromium oxide have been found in the final ware due to insolubility and the improper admixing and melting of certain high chromium frit glasses with the molten base glass. By the present invention this problem is overcome by providing compatible frit glasses that have lower softening and liquidus temperatures to produce uniform color in composite glasses made by the forehearth colorant technique.

OBJECTS

It is therefore an important object of this invention to provide oxidized amber glasses.

A further object is to provide oxidized amber glasses by the forehearth colorant technique.

A still further object is to provide novel colorant-enriched frit glasses that are oxidized, but are capable, when added to colorless base glasses of producing composite glasses within specifications "color-wise" for commercial ambers.

A further object is to provide novel frit glass batch compositions for producing oxidized amber frit glasses.

A further object is to provide amber frit glasses and amber composite glasses that are free of reducing agents.

THE INVENTION

By the present invention an oxidized frit glass is added to an oxidized colorless base glass more particularly a flint glass to produce commercially acceptable ambers. Further by this invention the frit glasses are unique by utilizing in the batch a combination of iron oxide and manganese oxide. The frit glasses are further unique by the fact that the iron oxide is kept in the ferric, $Fe_2O_3$, state. Along with the iron, there is included a small but important amount of cerium oxide. This masks any green color that might by chance be produced should some of the iron be present in the ferrous, FeO, state.

Example I.—In one specific production run of manufacturing a frit glass of the present invention, the following batch ingredients were employed:

| Ingredient: | Pounds |
| --- | --- |
| Amber sand (slight iron impurity) | 2,000 |
| Soda ash | 743 |
| Red iron oxide | 890 |
| Manganese ore | 2,084 |
| Zinc oxide | 231 |
| Sodium nitrate | 40 |
| Cerium hydrate | 66 |

The theoretical composition of the frit glass based on the above batch is as follows:

| Ingredient: | Percent by wt. |
| --- | --- |
| $SiO_2$ | 39.41 |
| $Al_2O_3$ | .51 |
| $Fe_2O_3$ | 19.24 |
| MnO | 27.58 |
| ZnO | 4.34 |
| BaO | 0.88 |
| PbO | 0.42 |
| $CeO_2$ | 1.00 |
| $Na_2O$ | 8.41 |

The $Al_2O_3$ in the above theoretical composition is present as an impurity in the batch sand. The BaO and PbO also result from minor impurities.

The ingredients were melted in a frit furnace under oxidizing firing conditions at a temperature in the range from about 2450 to 2575° F. being optimum, as measured by an optical pyrometer on the melt. To produce the proper oxidized state, melting fires were on the oxidizing side, maintaining approximately 0.9 to 1.2% excess oxygen over that necessary to burn the fuel used to fire the furnace. The molten frit glass is suitably converted for use by feeding as a stream from the outlet of the melting furnace and chilling rapidly. The chilling can be effected by flowing the molten glass as a stream through water cooled rolls and then into a body of water so that the glass breaks up into granular form. If desired, the granular frit glass can then be further reduced in particle size by grinding.

The frit glass was analyzed in its final pulverized form and was found to contain the following colorant constituents in the amounts indicated:

| Ingredient: | Percent by wt. |
| --- | --- |
| $Fe_2O_3$ | 14.7–15.5 |
| MnO | 25.0–26.5 |
| FeO | 0 |
| $MnO_2$ | 0 |

Example II.—In another specific production run of manufacturing a frit glass of the present invention, the following batch ingredients were employed:

| Ingredient: | Pounds |
| --- | --- |
| Sand | 2,000 |
| Soda ash | 743 |
| Red iron oxide | 889 |
| Manganese ore | 2,084 |
| Zinc oxide | 131 |
| Sodium nitrate | 40 |
| Cerium hydrate | 74 |

The theoretical composition of the frit glass, based on the above batch is as follows:

| Ingredient: | Percent by wt. |
| --- | --- |
| $SiO_2$ | 40.09 |
| $Al_2O_3$ (sand impurity) | 0.52 |
| $Fe_2O_3$ | 17.60 |
| MnO | 28.07 |
| ZnO | 2.51 |
| $CeO_2$ | 1.12 |
| $Na_2O+K_2O$ | 8.55 |
| Impurities BaO+PbO: .90+.43 | 1.33 |

The ingredients were melted under the conditions specified in Example I.

The frit glass was analyzed in its final pulverized form and was found to contain the following colorant constituents in the amounts indicated:

| Ingredient: | Percent by wt. |
|---|---|
| $Fe_2O_3$ | 13.1 |
| MnO | 24.4 |
| $MnO_2$ | 0.67 |
| FeO | 0 |

*Example III.*—Within the extended scope of the invention, there is a range of compositions that can be employed to produce oxidized amber frit glasses of high level colorant content, which in turn can be used to produce amber glasses meeting commercial specifications. Thus, the broad range of ingredients that can be used is encompassed by the following batch:

| Ingredients: | Pounds |
|---|---|
| Sand | 2,000 |
| Soda ash | 675–900 |
| Red iron oxide | 850–1,025 |
| Manganese ore | 1,950–2,150 |
| Zinc oxide | 100–245 |
| Sodium nitrate | 30–50 |
| Cerium hydrate | 50–80 |

The theoretical composition of the oxidized frit glasses produced by melting the above batch materials are as follows:

| Ingredient: | Percent by wt. |
|---|---|
| $SiO_2$ | 41.92–37.40 |
| $Al_2O_3$ | .51–.49 |
| $Fe_2O_3$ | 17.65–18.83 |
| MnO | 27.56–26.89 |
| ZnO | 2.01–4.36 |
| BaO | Nil |
| PbO | Nil |
| $CeO_2$ | .74–1.12 |
| $Na_2O+K_2O$ | 8.11–9.65 |

COMMENTS

In order to make a satisfactory amber color in the composite glass, the iron oxide must be kept in the ferric state ($Fe_2O_3$). If the iron oxide is present in the ferrous state (FeO), a greenish amber may be produced. The $CeO_2$ level is therefore important.

The manganese must be present in the manganous state, MnO. If manganese oxide is present as $MnO_2$, change of imparting a purple hue to the glass is possible. In other words, the frit glass must not be over oxidized. It is believed that an $MnO_2$ level of about 1.5–3.0% may be tolerated, depending on closenes to specifications demanded by the trade.

SUITABLE BASE GLASSES

Before discussing the manner in which the frit glasses of the invention are incorporated into colorless, oxidized base glasses to produce commercial amber, a description of suitable base glasses and desired composite glass optical properties will be provided to serve as an appropriate background on which the invention can be superimposed.

Base glasses that can be used in practicing the invention can have an oxide analysis encompassed within the ranges set out below. Generally, it will be found that glasses within these ranges are soda-lime-flint glasses that are widely used for the manufacture of colorless containers.

BASE GLASS COMPOSITIONS

| Ingredient: | Percent by wt. |
|---|---|
| $SiO_2$ | 60–75 |
| $Al_2O_3$ | .3–10 |
| CaO+MgO | 6–15 |
| $Na_2O$ | 12–18 |
| $K_2O$ | 0–5 |
| BaO | 0–5 |
| Se | .00025–.00035 |

The following specific examples are theoretical soda-lime-flint batch analyses of colorless base glasses into which the highly colored, oxidized amber frit glasses of the invention can be combined to produce composite glasses meeting commercial standards for amber.

SPECIFIC BASE GLASS NO. I

| Ingredient: | Percent by wt. |
|---|---|
| $SiO_2$ | 72.01 |
| $Al_2O_3$ | 1.74 |
| $Fe_2O_3$ | .039 |
| $TiO_2$ | .029 |
| CaO | 11.38 |
| MgO | 1.15 |
| $R_2O$ ($Na_2O+K_2O$) | 13.65 |
| Se | .00025–.00030 |

SPECIFIC BASE GLASS NO. II

| Ingredient: | Percent by wt. |
|---|---|
| $SiO_2$ | 71.45 |
| $Al_2O_3$ | 1.32 |
| $Fe_2O_3$ | .037 |
| $TiO_2$ | .13 |
| CaO | 8.32 |
| MgO | 5.58 |
| $R_2O$ ($Na_2+K_2O$) | 13.28 |
| Se | .00025–.00035 |

The manufacture of the above glasses is set forth in Table XX, B–11, page 245 of "Handbook of Glass Manufacture" by Tooley, Ogden Publishing Company, New York, N.Y., 1953.

In accordance with the broad principles of the present invention, the frit glasses can be added to a broad range of oxidized base glasses. Therefore, the exemplary soda-lime-flint glasses described are not to be considered limiting on the invention. They are suggested merely as appropriate for commercial container production.

REQUIRED OPTICAL PROPERTIES FOR COMMERCIAL AMBER GLASSES

In the manufacture of amber glasses, certain color standards are adhered to. In drug and pharmaceutical ware, the glass must meet the U.S. Pharmacopoeia specifications on ultraviolet ray absorption. The specification states that the light resistant container shall not transmit more than 10% of the incident light at any wave length between 290 m$\mu$ and 450 m$\mu$ through the actual thickness of the container.

Although not a generally required specification, "purity" is sometimes used to designate the percentage of transmitted light, that is within the dominant wave length range for a particular color of glass. The glass absorbs the remaining light of that wave length range. Relative to ambers it is usually specified that the commercial grades will not transmit more than about 17 to 23% of the light at 550 m$\mu$.

From actual analysis run on samples obtained from production operations in accordance with the present invention, it has been proven that the amber composite glasses produced fully meet the above standards, as set forth by the industry. Results are recorded below at the end of the section entitled Composite Glass Production.

COMPOSITE GLASS PRODUCTION

For the production of glass containers in accordance with this invention, a colorless, oxidized base glass is prepared in a melting tank of several hundred tons capacity. The batch constituents are added and proceed through the tank under melting and fining conditions. Glass is discharged in molten form from the fined end of the tank by being run through one or a plurality of forehearths, each feeding a container manufacturing machine. For description of one preferred form of such forehearth, attention is directed to Rough and Swain Patent 3,057,175 dated Oct. 9, 1962. Another form of forehearth is discussed and shown in Hagedorn Patent 3,024,121 dated Mar. 6, 1962.

Generally the colorless base glass issues from the melting tank into the forehearth at a temperature in the range from about 2300°F. to about 2500° F. The frit glasses made in accordance with the present invention are well adapted for addition to the base glass at such temperatures since they are melted and fined at only 2450 to 2575° F. The frit glass will suitably have a finely divided form for the addition, as in the range from about −8 to +30 mesh. Stirring means or mixing baffles known in the art are used to produce homogeneous admixture of the frit glass into the colorless base glass to produce the uniformly colored composite glass. Attention is invited to the Hagedorn patent for a disclosure of typical mixing means.

To produce composite glasses of standard amber color, the frit of Example I was added to the forehearth of a furnace producing either Specific Base Glass No. I or Specific Base Glass No. II at a rate of 160 to 200 lbs. per ton of base glass.

The amounts of colorants in the composite glass were as follows:

| Ingredient: | Percent by wt. |
| --- | --- |
| $Fe_2O_3$ | 0.56 |
| MnO | 1.08 |
| FeO | 0 |
| $MnO_2$ | 0.10 |

The following are actual transmission readings on a composite amber glass so made:

Transmittance at 550 m$\mu$: 22.0 to 26.7%.

The glass displayed excellent ultraviolet ray protection, and is equal to or better than the amber glass, produced by "standard" manufacturing techniques, e.g. by batch in a full melter.

SUMMARY

From the foregoing it is to be understood that novel oxidized amber glasses are produced by the present invention. For the first time it is now commercially possible to manufacture amber by forehearth addition of an oxidized frit glass to an oxidized, colorless base glass under oxidizing conditions. All of this is effected without either a reducing atmosphere or without expensive reductants in the frit glass batch.

I claim:

1. An amber colored glass consisting essentially of the following ingredients in the indicated ranges of percent by weight on a theoretical oxide basis:

| Ingredient: | Percent by wt. |
| --- | --- |
| $SiO_2$ | 37.40–41.92 |
| $Al_2O_3$ | 0.49–0.51 |
| $Fe_2O_3$ | 17.60–19.24 |
| MnO | 26.89–28.07 |
| ZnO | 2.01–4.36 |
| $CeO_2$ | 0.74–1.12 |
| $Na_2O+K_2O$ | 8.11–9.65 |
| $MnO_2$ | 0–3.0 |

2. An amber colored glass, as defined in claim 1, wherein said glass is a frit glass consisting essentially of the following ingredients on a theoretical oxide basis:

| Ingredient: | Percent by wt. |
| --- | --- |
| $SiO_2$ | 39.41 |
| $Fe_2O_3$ | 19.24 |
| MnO | 27.58 |
| ZnO | 4.34 |
| $CeO_2$ | 1.00 |
| $Na_2O$ | 8.41 |

3. An amber colored glass, as defined in claim 1, wherein said glass is a frit glass consisting essentially of the following ingredients on a theoretical oxide basis:

| Ingredient: | Percent by wt. |
| --- | --- |
| $SiO_2$ | 40.09 |
| $Fe_2O_3$ | 17.60 |
| MnO | 28.07 |
| ZnO | 2.51 |
| $CeO_2$ | 1.12 |
| $Na_2O+K_2O$ | 8.55 |

4. In a process of producing amber glass, the steps of; providing a molten mass of oxidized soda-lime base glass consisting essentially of the following ingredients in the indicated ranges of percent by weight:

| Ingredient: | Percent by wt. |
| --- | --- |
| $SiO_2$ | 60–75 |
| $Al_2O_3$ | .3–10 |
| CaO+MgO | 6–15 |
| $Na_2O$ | 12–18 |
| $K_2O$ | 0–5 |
| BaO | 0–5 |
| Se | .00025–.00035 | maintaining said base glass in an oxidized condition while adding an oxidized amber colored frit glass thereto consisting essentially of the following ingredients in the indicated ranges of percent by weight on a theoretical oxide basis:

| Ingredient: | Percent by wt. |
| --- | --- |
| $SiO_2$ | 41.92–37.40 |
| ZnO | 2.01–4.36 |
| $CeO_2$ | .74–1.12 |
| $Na_2+K_2O$ | 8.11–9.65 |
| $Fe_2O_3$ | 17.60–19.24 |
| MnO | 26.89–28.07 |

5. An amber colored glass consisting essentially of the following ingredients in the indicated ranges of percent by weight on a theoretical oxide basis:

| Ingredient: | Percent by wt. |
| --- | --- |
| $SiO_2$ | 37.40–41.92 |
| $Al_2O_3$ | 0.49–0.51 |
| ZnO | 2.01–4.36 |
| $CeO_2$ | 0.74–1.12 |
| $Na_2O+K_2O$ | 8.11–9.65 | said glass further consisting essentially of the following ingredients in the indicated ranges of percent by weight on an analytical oxide basis:

| Ingredient: | Percent by wt. |
| --- | --- |
| $Fe_2O_3$ | 13.1–15.5 |
| MnO | 24.4–26.5 |
| $MnO_2$ | 0–3.0 |

6. An amber colored glass, as defined in claim 5, wherein the total amount of $MnO_2$ is not greater than 0.67 percent by weight.

References Cited

UNITED STATES PATENTS

| 2,923,635 | 2/1960 | Beck et al. | 106—52 |
| 3,024,121 | 3/1962 | Hagedorn | 106—52 |

OTHER REFERENCES

Weyl: Coloured Glasses, 1959, p. 116.

TOBIAS E. LEVOW, Primary Examiner

R. D. EDMONDS, Assistant Examiner

PO-1050
(5/69)

UNITED STATES PATENT OFFICE
CERTIFICATE OF CORRECTION

Patent No. 3,481,750          Dated Dec. 2, 1969

Inventor(s) Arthur B. Swain

It is certified that error appears in the above-identified patent and that said Letters Patent are hereby corrected as shown below:

Column 2, line 69 "2950" should be --1950--.
Column 5, line 48 "change" should be --chance--;
line 51 "closenes" should be --closeness--.

SIGNED AND
SEALED
AUG 11 1970

(SEAL)
Attest:

Edward M. Fletcher, Jr.
Attesting Officer

WILLIAM E. SCHUYLER, JR.
Commissioner of Patents